United States Patent
Kito et al.

(10) Patent No.: US 7,732,505 B2
(45) Date of Patent: Jun. 8, 2010

(54) ENERGY RAY-CURABLE INK COMPOSITION

(75) Inventors: Katsuyuki Kito, Ibaraki (JP); Nagayuki Takao, Ibaraki (JP)

(73) Assignee: Hitachi Maxell, Ltd., Ibaraki-shi, Osaka (JP)

( * ) Notice: Subject to any disclaimer, the term of this patent is extended or adjusted under 35 U.S.C. 154(b) by 0 days.

(21) Appl. No.: 11/662,273

(22) PCT Filed: Oct. 6, 2005

(86) PCT No.: PCT/JP2005/018531

§ 371 (c)(1),
(2), (4) Date: Mar. 9, 2007

(87) PCT Pub. No.: WO2006/041004

PCT Pub. Date: Apr. 20, 2006

(65) Prior Publication Data

US 2008/0076846 A1 Mar. 27, 2008

(30) Foreign Application Priority Data

Oct. 8, 2004 (JP) .......................... P2004-296538

(51) Int. Cl.
*C08F 2/46* (2006.01)
*C08J 3/28* (2006.01)
*B41M 5/00* (2006.01)
*C09D 11/00* (2006.01)

(52) U.S. Cl. .................. 522/175; 522/173; 522/150; 522/151; 522/152; 522/178; 522/182; 428/32.1; 428/32.22; 428/32.6; 106/31.13; 106/31.6

(58) Field of Classification Search .............. 522/26, 522/175
See application file for complete search history.

(56) References Cited

U.S. PATENT DOCUMENTS

| 2002/0064603 | A1 | 5/2002 | Noguchi |
| 2003/0149130 | A1* | 8/2003 | Kondo ........................ 523/160 |

FOREIGN PATENT DOCUMENTS

| CN | 1240466 A | | 1/2000 |
| JP | 3-216379 A | | 9/1991 |
| JP | 9-291240 A | | 11/1997 |
| JP | 2003-11487 A | | 1/2003 |
| JP | 2003011487 A | * | 1/2003 |
| JP | 2003-301130 A | | 10/2003 |
| JP | 2004-204240 A | | 7/2004 |
| JP | 2004-323753 A | | 11/2004 |
| WO | WO-98/27171 A1 | | 6/1998 |

* cited by examiner

*Primary Examiner*—Sanza L McClendon
(74) *Attorney, Agent, or Firm*—Birch, Stewart, Kolasch & Birch, LLP.

(57) ABSTRACT

An active energy ray-curable ink composition comprising a colorant, a monomer and a photopolymerization initiator, in which the monomer contains an acrylamide derivative in an amount of 10 to 90% by weight based on the whole weight of the ink composition, and the ink composition has a viscosity of 3 to 35 mPa·s at 25° C. The ink composition has a low viscosity without dilution by a diluent solvent, good storage stability, good pigment dispersibility when a pigment is used as a colorant and also good continuous ejection stability to a printing medium, has a good curing property at a low energy level such as a cumulative amount of light of 150 mJ/cm$^2$ or less, and it can attain good printing quality on nonabsorbable printing medium and achieves good adhesion of printed images to the printing medium.

12 Claims, No Drawings

ENERGY RAY-CURABLE INK COMPOSITION

FIELD OF THE INVENTION

The present invention relates to an active energy ray-curable ink composition, an ink composition which is mainly printed by an ink jet printing system and cured by the irradiation of an active energy ray, in particular, a UV-curable ink composition.

BACKGROUND ART

An ink jet printing system performs printing by ejecting an ink liquid from a nozzle towards a printing medium using a pressure, heat or an electric field as a driving source. Such a printing system has low running cost and achieves high printing quality, and it can use various inks such as aqueous inks, oil-based inks, etc. Therefore, the ink jet printing system extends the market in these years.

Nowadays, an image-forming method by the ink jet printing system has great advantages from an economical standpoint in applications which frequently change printed materials such as large size printed advertisements that require a large printing area, since it can provide the same image quality as silver halide photography at very reasonable cost.

As ink compositions used in the ink jet printing system, ink compositions which are cured by the irradiation of an active energy ray in a specific wavelength range, in particular, UV-curable ink compositions which are cured by the irradiation of ultraviolet (UV) ray are available. The major components of the UV-curable ink compositions include UV-curable monomers, pigments or dyes as colorants, and photopolymerization initiators. If necessary, the ink compositions may optionally contain various additives.

However, the viscosity of the UV-curable ink compositions usually exceeds 35 mPa·s at 25° C. When the UV-curable ink compositions are used in the existing ink jet printing system, their viscosity should be 35 mPa·s or less, preferably 20 mPa·s or less.

To achieve such a low viscosity, a UV-curable ink composition containing a volatile organic solvent such as ethyl lactate, butyl acetate, etc. as a diluent solvent together with a UV-curable monomer, a colorant and a photopolymerization initiator is known. However, when such an ink composition is used, the evaporation of the diluent solvent such as VOC (volatile organic compound) may worsen work environment and natural environment. In addition, the diluent solvent remains in the printed ink after the composition is cured with UV ray, so that the film properties of the printed images may decrease, in particular, the adhesion of the printed images to a substrate of a printing medium may decrease.

A UV-curable ink composition is also proposed, which ink composition comprises a vinyl compound, an alkyl (meth) acrylate, a polyfunctional (poly)alkoxyacrylate, etc. as a UV-curable monomer and contains the decreased amount of a diluent solvent (JP-A-5-214279, JP-A-5-214280 and JP-A-2000-504778).

However, the proposed UV-curable ink compositions usually have low monomer reactivity and thus it cannot have a sufficient curing property, since oxygen interferes with the curing at a low energy level such as a cumulative amount of light of 150 mJ/cm$^2$ or less, and therefore such ink compositions may have limitations in high-speed printing applications.

The curing property increases as the amount of the photopolymerization initiator increases. However, the solubility of the photopolymerization initiator in the monomer is limited, and thus the amount of the photopolymerization initiator compounded in the ink composition is limited and insufficient for attaining the sufficient curing property. In addition, when a large amount of the photopolymerization initiator is compounded, the unreacted photopolymerization initiator remains and tends to have adverse effects on the properties of the cured film.

DISCLOSURE OF THE INVENTION

Problems to be Solved by the Invention

An object of the present invention is to provide an active energy ray-curable ink composition, which has a low viscosity in the absence of a diluent solvent, good storage stability, good pigment dispersibility when a pigment is used as a colorant and also good continuous ejection stability to a printing medium, has a good curing property at a low energy level such as a cumulative amount of light of 150 mJ/cm$^2$ or less, and which can attain good printing quality on nonabsorbable printing medium and achieves good adhesion of printed images to the printing medium.

Means for Solving the Problems

As a result of the extensive studies made by the present inventors, it has been found that the above problems can be solved by selecting an acrylamide derivative as an active energy ray-curable monomer to be contained in an active energy curable ink composition, and using the acrylamide derivative in a specific amount. Then, the present invention has been completed.

Accordingly, the present invention provides an active energy ray-curable ink composition comprising a colorant, a monomer and a photopolymerization initiator but substantially no diluent solvent, characterized in that the monomer comprises an acrylamide derivative, the amount of the acrylamide derivative is 10 to 90% by weight based on the whole weight of the ink composition, and the ink composition has a viscosity of 3 to 35 mPa·s at 25° C.

Furthermore, in the preferred embodiments, the present invention provides the above ink composition which has a viscosity of 3 to 20 mPa·s at 25° C.; the above ink composition which contains a tri- or higher polyfunctional acrylate monomer as a monomer and in which the amount of the tri- or higher polyfunctional acrylate monomer is 10 to 50% by weight based on the whole weight of the ink composition; the above ink composition which contains at least two photopolymerization initiators; the above ink composition which contains at least 2-methyl-1-[4-(methylthio)phenyl]-2-morpholinopropan-1-one and a compound selected from thioxanthones; the above ink composition in which the amount of the photopolymerization initiator is 1 to 20% by weight based on the whole weight of the ink composition; the above ink composition in which the colorant is an organic pigment and/or an inorganic pigment; the above ink composition in which the amount of the organic pigment and/or inorganic pigment is 1 to 10% by weight based on the whole weight of the ink composition; the above ink composition which contains a polymer as a pigment dispersant and the amount of the polymer is 5 to 150% by weight based on the weight of the organic pigment and/or inorganic pigment; the above ink composition which is cured at a cumulative amount of light of 150 mJ/cm$^2$ or less; and the above ink composition which is used in an ink jet printing system.

EFFECTS OF THE INVENTION

Since the ink composition of the present invention uses a specific amount of an acrylamide derivative as a UV-curable monomer, it has a low viscosity in the absence of a diluent solvent, good storage stability, good pigment dispersibility when a pigment is used as a colorant and also good continuous ejection stability to a printing medium, has a good curing property at a low energy level such as a cumulative amount of light of 150 mJ/cm$^2$ or less, and it can attain good printing quality on nonabsorbable printing medium and achieves good adhesion of printed images to the printing medium.

PREFERRED EMBODIMENTS FOR WORKING THE INVENTION

According to the present invention, an acrylamide derivative is used as an active energy-ray curable monofunctional monomer. By the use of the acrylamide derivative, the ink composition of the present invention has a sufficiently low viscosity at room temperature, and also a good curing property such that it is quickly cured at a low energy level such as a cumulative amount of light of 150 mJ/cm$^2$ or less. In contrast, when a conventional (meth)acrylate monomer is used as a monofunctional monomer, an ink composition may hardly have the above curing property, although it may have a low viscosity at room temperature.

The "(meth)acrylate" used herein is intended to mean acrylate and/or methacrylate.

Examples of the acrylamide derivative include N,N-dimethyl(meth)acrylamide, N,N-diethyl(meth)acrylamide, N,N-dipropyl(meth)acrylamide, N,N-dibutyl(meth)acrylamide, N,N-dihexyl(meth)acrylamide, N-methyl(meth)acrylamide, N-ethyl(meth)acrylamide, N-isopropyl(meth)acrylamide, N-hexyl(meth)acrylamide, (meth)acryloylmorpholine, N,N-dimethylaminomethyl(meth)acrylamide, N,N-dimethylaminoethyl(meth)acrylamide, N,N-dimethylaminopropyl(meth)acrylamide, N,N-dimethylaminohexyl(meth)acrylamide, N,N-diethylaminomethyl(meth)acrylamide, N,N-diethylaminoethyl(meth)acrylamide, N,N-diethylaminopropyl(meth)acrylamide, N,N-diethylaminohexyl(meth)acrylamide, and the like. The "(meth)acrylamide" used herein is intended to mean acrylamide and/or methacrylamide.

The acrylamide derivatives may be used singly, or as a mixture of two or more of them. Among them, N,N-dimethylacrylamide, N,N-diethylacrylamide, acryloylmorpholine and the like are particularly preferably used.

In the present invention, the amount of the acrylamide derivative is from 10 to 90% by weight, preferably from 20 to 80% by weight, based on the whole weight of the ink composition. When the amount of the acrylamide derivative is less than 10% by weight, the viscosity of the ink composition may not be sufficiently decreased. When the amount of the acrylamide derivative exceeds 90% by weight, the amounts of other components in the ink composition decrease so that the curing property and the like tend to be deteriorated.

In the present invention, as an active energy ray-curable monomer, a tri- or higher polyfunctional acrylate monomer is preferably used together with the acrylamide derivative, in an amount of 10 to 50% by weight, in particular 20 to 40% by weight based on the whole weight of the ink composition.

When the amount of the tri- or higher polyfunctional acrylate monomer is less than 10% by weight or when a difunctional acrylate monomer is used instead of the tri- or higher polyfunctional acrylate monomer, the curing property of the ink composition deteriorates so that the ink composition may not sufficiently cured at a low energy level such as a cumulative amount of light of 150 mJ/cm$^2$ or less.

Examples of the tri- or higher polyfunctional acrylate monomer include hexafunctional monomers such as dipentaerythritol hexa(meth)acrylate, caprolactone-modified dipentaerythritol hexa(meth)acrylate, their modified derivatives; pentafunctional monomers such as dipentaerythritol hydroxypenta(meth)acrylate, caprolactone-modified dipentaerythritol hydroxypenta(meth)acrylate, etc.; tetrafunctional monomers such as ditrimethylolpropane tetra(meth)acrylate, ethoxylated pentaerythritol tetra(meth)acrylate, pentaerythritol tetra(meth)acrylate, etc.; and trifunctional monomers such as trimethylolpropane tri(meth)acrylate, ethylene oxide-modified trimethylolpropane tri(meth)acrylate, caprolactone-modified trimethylolpropane tri(meth)acrylate, pentaerythritol tri(meth)acrylate, tris(2-hydroxyethyl) isocyanurate tri(meth)acrylate, propoxylated glyceryl tri(meth)acrylate, etc.

These polyfunctional acrylate monomers may be used singly, or as a mixture of two or more of them. Among them, dipentaerythritol hexaacrylate and dipentaerythritol hydroxypentaacrylate are particularly preferably used.

In the present invention, the ink composition may optionally contain a difunctional acrylate monomer or a monofunctional acrylate monomer other than the acrylate monomer, besides the above-described monomers. However, the total amount of these optional monomers is preferably 30% by weight or less, in particular 10% by weight or less, based on the whole weight of the ink composition, so as not to impair the effects of the present invention.

Examples of the difunctional acrylate monomer include hydroxypivalic acid neopentyl glycol di(meth)acrylate, polytetramethylene glycol di(meth)acrylate, trimethylolpropane (meth)acrylic acid benzoic acid ester, diethylene glycol di(meth)acrylate, triethylene glycol di(meth)acrylate, tetraethylene glycol di(meth)acrylate, polyethylene glycol(200) di(meth)acrylate, polyethylene glycol(400) di(meth)acrylate, polyethylene glycol(600) di(meth)acrylate, polyethylene glycol(1000) di(meth)acrylate, dipropylene glycol di(meth)acrylate, tripropylene glycol di(meth)acrylate, polypropylene glycol (400) di(meth)acrylate, polypropylene glycol (700) di(meth)acrylate, neopentyl glycol di(meth)acrylate, 1,3-butanediol di(meth)acrylate, 1,4-butanediol di(meth)acrylate, 1,6-hexanediol di(meth)acrylate, 1,9-nonanediol di(meth)acrylate, neopentyl glycol di(meth)acrylate, dimethylol-tricyclodecane di(meth)acrylate, bisphenol A-ethylene oxide adduct di(meth)acrylate, bisphenol A-propylene oxide adduct di(meth)acrylate, etc.

Examples of the monofunctional acrylate monomer include amyl (meth)acrylate, isoamyl (meth)acrylate, octyl (meth)acrylate, isooctyl (meth)acrylate, decyl (meth)acrylate, isodecyl (meth)acrylate, lauryl (meth)acrylate, isomyristyl (meth)acrylate, stearyl (meth)acrylate, isostearyl (meth)acrylate, 2-ethylhexyl-diglycol (meth)acrylate, 2-(meth)acryloyloxyethyl hexahydrophthalic acid, neopentyl glycol (meth)acrylic acid benzoic acid ester, butoxyethyl (meth)acrylate, ethoxy-diethylene glycol (meth)acrylate, methoxy-triethylene glycol (meth)acrylate, methoxy-polyethylene glycol (meth)acrylate, methoxypropylene glycol (meth)acrylate, phenyxyethyl (meth)acrylate, phenoxy-polyethylene glycol (meth)acrylate, nonylphenol-ethylene oxide adduct (meth)acrylate, tetrahydrofurfuryl (meth)acrylate, isobornyl (meth)acrylate, 2-hydroxyethyl(meth)acrylate, 2-hydroxypropyl (meth)acrylate, 2-hydroxybutyl (meth)acrylate, 2-hydroxy-3-phenoxypropyl (meth)acrylate, 2-(meth)acryloyloxyethyl-succinic acid, 2-(meth)acryloyloxyethyl-phthalic acid, 2-(meth) acryloyloxyethyl-2-hydroxyethyl-phthalic acid, as well as the above acrylate monomers to which a phosphorus- or fluorine-containing functional group or groups is/are bonded.

In the present invention, a photopolymerization initiator is used. The photopolymerization initiator may be any one of conventional photopolymerization initiators such as aryl ailcyl ketones, ketoxime, acylphosphine oxides, acyl phosphonates, 5-phenyl thiobeuzoate, titanocene, aromatic ketones, thioxanthones, benzil, quinone derivatives, ketocoumarins, etc. Specific examples of the initiator include bis(2,4,6-trimethylbenzoyl)-phenylphosphine oxide, 1-hydroxychelohexyl phenyl ketone, 2-methyl-1-[4-(methylthio)phenyl]-2-morpholinopropan-1-one, 2-hydroxy-2-methyl-1-phenyl-propan-1-one, 2-benzyl-2-dimethylamino-1-(4-morpholinophenyl)-butenone-1,2,2-dimethoxy-1,2-diphenylethen-1-one, 1,2-octanedione-[4-(phenyhhio)-2-(o-benzoyloxime)], bis (2,6-dimethoxybenzoyl)-2,4,4-trimethyl-pentylphosphine oxide, 2,4,6-trimethylbenzoyl-phosphine oxide, 2,4-diethylthioxanthone, 2-chlorothioxanthone, isopropylthioxanthone, [4-(methylphenylthio)phenyl]phenylmethanone, etc.

These photopolymerization initiators may be used singly, but they are preferably used as a mixture of two or more of them. Among them, a photopolymerization initiator mixture containing 2-methyl-1-[4-(methylthio)phenyl]-2-morpholinopropan-1-one and at least one thioxanthone is particularly preferably used.

In the present invention, the amount of the photopolymerization initiator(s) is 1 to 20% by weight, preferably 2 to 15% by weight, based on the whole weight of the ink composition. When the amount of the initiator is less than 1% by weight, the ink composition may not have a sufficient curing property when it is irradiated by the active energy ray such as UV ray and so on. When the amount of the initiator exceeds 20% by weight, the unreacted initiator remains so that the print quality may be decreased.

Although various dyes may be used as the colorants in the ink composition of the present invention, pigments such as inorganic pigments and/or organic pigments are preferably used.

The pigment is usually used in an amount of 1 to 10% by weight, preferably 2 to 7% by weight, more preferably 3 to 6% by weight based on the whole weight of the ink composition. When the amount of the pigment is too small, the coloring power is insufficient. When the amount of the pigment is too large, the viscosity of the ink composition increases so that the ink composition tends to lose flowability.

To increase the dispersibility of the pigment, a suitable pigment derivative may be used in combination with the pigment. As the pigment derivative, a pigment derivative having a dialkylaminoalkyl group, a pigment derivative having dialkylaminoalkylsulfonamido group, etc. are preferably used.

Examples of the inorganic pigment include titanium oxide, Chinese white (zinc flower), zinc oxide, lithopone, iron oxide, aluminum oxide, silicon dioxide, kaolinite, montmorillonite, talc, barium sulfate, calcium carbonate, silica, aluminum, cadmium red, red oxide, molybdenum red, chrome vermilion, molybdate orange, chrome yellow, cadmium yellow, yellow iron oxide, titanium yellow, chromium oxide, viridian, cobalt green, titanium cobalt green, cobalt chrome green, Armenian blue, ultramarine blue, Paris blue, cobalt blue, cerulean blue, manganese violet, cobalt violet, mica, etc.

Examples of the organic pigments include azo pigments, azomethine pigments, polyazo pigments, phthalocyanine pigments, quinacridone pigments, anthraquinone pigments, indigo pigments, thioindigo pigments, quinophthalone pigments, benzimidazolone pigments, isoindoline pigments, etc. Carbon black comprising acidic, neutral or basic carbon may also be used. In addition, hollow particles of crosslinked acrylic resins may be used as a pigment.

Examples of pigments contained in cyan ink compositions include C.I. Pigment Blue 1, 2, 3, 15:3, 15:4, 16, 22 and 60, etc. Among them, one or more of C.I. Pigment Blue 15:3 and 15:4 are preferably used in view of their good weather resistance and coloring power.

Examples of pigments contained in magenta ink compositions include C.I. Pigment Red 5, 7, 12, 48(Ca), 48(Mn), 57(Ca), 57:1, 112, 122, 123, 168, 184, 202, 209 and 254, C.I. Pigment Violet 19, etc. Among them, one or more of C.I. Pigment Red 122, 202, 209 and 254 and C.I. Pigment Violet 19 are preferably used in view of their good weather resistance and coloring power.

Examples of pigments contained in yellow ink compositions include C.I. Pigment Yellow 1, 2, 3, 12, 13, 14C, 16, 17, 73, 74, 75, 83, 93, 95, 97, 98, 109, 110, 114, 120, 128, 129, 130, 138, 139, 147, 150, 151, 154, 155, 180, 185, 213, 214, etc. Among them, C.I. Pigment Yellow 74, 83, 109, 110, 120, 128, 138, 139, 150, 151, 154, 155, 213 and 214 are preferably used singly or as a mixture thereof in view of their good weather resistance.

Examples of pigments contained in black ink compositions include HCF, MCF, RCF, LEF and SCF (available from Mitsubishi Chemical Co., Ltd.), MONARCH and REGAL (available from Cabot, USA), COLOR BLACK, SPECIAL BLACK and PRINTEX (available from Degussa Huls AG), TOKA BLACK (available from TOKAI CARBON Co., Ltd.), RAVEN (available from Columbian Chemical, USA), and the like. Among them, one or more of HCF #2650, #2600, #2350 and #2300, MCF #1000, #980, #970 and #960, MCF 88, LFFMA 7, MA 8, MA 11, MA 77 and MA 100 (available from Mitsubishi Chemical Co., Ltd.), and PRINTEX 95, 85, 75, 55 and 45 (available from Degussa Huls AG) are preferable.

The active energy ray-curable ink composition of the present invention contains the colorant, the acrylamide derivative and the photopolymerization initiator. Furthermore, it usually contains a tri- or higher polyfunctional monomer and, if desired, a difunctional monomer and/or a monofunctional monomer other than the acrylamide derivative. However, it contains substantially no diluent solvent.

Herein, "containing substantially no diluent solvent" is intended to mean that the ink composition contains no diluent solvent, or it contains a volatile organic solvent as an impurity in a very small amount such that the volatilization of the organic solvent does not worsen the work environment and natural environment.

The diluent solvent is intended to mean an organic solvent having a boiling point in a range between 50° C. and 200° C. Examples of such an organic solvent include lactic acid esters, acetic acid ester, propioninc acid esters, butyric acid esters, (poly)ethylene glycol ethers and esters, etc. In addition, other various conventional organic solvents such as methyl ethyl ketone, cyclohexane, toluene, xylene, etc. may be used.

The active energy ray-curable ink composition of the present invention may be prepared by various methods. When the pigment is used as the colorant, the ink composition is preferably prepared as follows: Firstly, the inorganic pigment and/or the organic pigment and a part of the acrylamide derivative as a diluent monomer are premixed and then stirred and dispersed with a barrel-driving type mills (e.g. ball mill, centrifugal mill, planetary mill, etc.), high speed rotation mills (e.g. sand mill, etc.), medium-agitation mills (e.g. agitated vessel mill, etc.), simple dispersing equipments (e.g. disper, etc.), and the like to obtain a primary dispersion.

Next, to the primary dispersion, the reminder of the acrylamide derivative, the tri- or higher polyfunctional monomer as a highly crosslinkable monomer and the photopolymerization initiator are added and uniformly mixed using a simple stirrer such as a three-one motor, a magnetic stirrer, a disper, a homogenizer, etc. They may be mixes with a mixer such as a line mixer. Furthermore, to reduce the particle size of the precipitated particles, the dispersion may optionally be mixed with a dispersing equipment such as a bead mill, a high pressure jet mill, etc.

In the preparation of the primary dispersion, a pigment-dispersant is preferably used. The pigment-dispersant has good affinity with the pigment and functions to disperse and stabilize the pigment in the composition.

As the pigment-dispersant, an ionic or nonionic surfactant, or an anionic, cationic or nonionic polymer is used. In view of the dispersion stability, the polymer, in particular, a polymer having a cationic group or an anionic group is preferable. The pigment-dispersant disperses and stabilizes the pigment in the composition through an acid-base interaction between the pigment and the dispersant. Thus, the pigment-dispersant preferably contains at least one of a cationic group and an anionic group, which function as pigment-absorbing sites, and the kind and amount of the cationic group and the anionic group of the dispersant are selected depending on the kind of the pigment.

Examples of the pigment-dispersant include SOLSPERSE (available from Lubrizol Corporation), DISPER BYK (available from BYK-Chemie), EFKA (available from EFKA Additives), etc. Among them, DISPER BYK 161, 162 and 168, and EFKA 4050, 4055 and 4060 are preferable, and DISPER BYK 168 which is not diluted with any diluent solvent is particularly preferable. These pigment-dispersant are preferably used depending on the kinds of the pigment and the monomer used.

In the case of pigment-dispersants which are available in the market in the form of solutions containing a low-boiling organic solvent (e.g. toluene, xylene, ethyl acetate, butyl acetate, methyl ethyl ketone, etc.), when the solution as such is used in the preparation of the ink composition, the diluent solvent remains in the ink composition. Therefore, the diluent solvent should be removed from the solution type pigment-dispersants. To remove the diluent solvent, vacuum distillation, reprecipitation, etc. is used.

When the pigment-dispersant comprising a polymer is used in the present invention, the amount of the pigment-dispersant depends on the kind of the organic pigment and/or the inorganic pigment, the dispersing conditions, and so on. The amount of the pigment-dispersant is 5 to 150% by weight based on the weight of the organic pigment and/or the inorganic pigment. When the organic pigment is used, the amount of the pigment-dispersant is preferably 40 to 150% by weight. When the inorganic pigment is used, the amount of the pigment-dispersant is preferably 5 to 60% by weight.

When a polymerization inhibitor is added, if desired, to the active energy ray-curable ink composition of the present invention, the polymerization initiated by heat or light can be inhibited during storage and thus the storage stability of the ink composition is improved.

Various compounds are known as polymerization inhibitors. In the present invention, those widely used in general polymerizable compositions may be used. For example, phenol type antioxidants, hindered amine type light stabilizers, phosphorus-containing antioxidants, hydroquinone monoalkyl ethers which are commonly used for (meth) acrylic monomers, and the like may be used.

Specific examples of the polymerization inhibitors include hydroquinone monomethyl ether, hydroquinone, tert-butyl-cathecol, pyrogallol, TINUVIN 111 FDL, TINUVIN 123, TINUVIN 144, TINUVIN 292, TINUVIN XP40 and TINUVIN XP60 (all available from Ciba Specialty Chemicals, Inc.) and the like.

The polymerization inhibitors may be used singly, or as a mixture of two or more of them. Hydroquinone monomethyl ether is particularly preferably used.

If the polymerization inhibitor is used in an excessive amount, it interferes with the curing of the ink composition by the irradiation of the active energy ray such as UV ray. Therefore, the amount of the polymerization inhibitor should be in a range suitable for inhibiting the polymerization during the preparation and storage of the ink composition without interfering with the curing of the ink composition. The amount of the polymerization inhibitor is preferably 200 to 20,000 ppm, more preferably 500 to 2,000 ppm.

The active energy ray-curable ink composition of the present invention may optionally contain conventionally used additives such as surfactants, surface-modifiers, leveling agents, defoaming agents, antioxidants, pH regulators, charging agents, disinfectants, preservatives, deodorants, charge-adjusters, wetting agents, anti-skinning agents, perfumes, pigment derivatives, etc. Such optional additives may be used in conventional amounts depending on the kinds thereof.

The active energy ray-curable ink composition of the present invention comprises the above components and is characterized in that it has a viscosity of 3 to 35 mPa·s, particularly preferably 3 to 20 mPa·s, at 25° C.

The ink composition of the present invention usually has a surface tension of 20 to 40 mN/m, particularly preferably 25 to 35 mN/m, at 25° C.

When the colorant is the organic pigment and/or the inorganic pigment, the pigment particles have a dispersion average particle size of 20 to 200 nm, particularly preferably 50 to 160 nm. When the dispersion average particle size is less than 20 nm, the particle size is too small so that the printed material may not have sufficient light resistance. When the dispersion average particle size exceeds 200 nm, the fineness of the printed material may sometimes deteriorate.

The active energy ray-curable ink composition of the present invention contains no diluent solvent, has a low viscosity and ensures good dispersion of the pigment which is used as the colorant. In addition, it has good storage stability and does not suffer from problems such as the increase of the viscosity or the precipitation of the pigment during the storage or use. Therefore, it has a stable ejecting property and good continuous ejection stability at room temperature in the ink jet printing system.

The active energy ray-curable ink composition of the present invention can be quickly cured during printing by the irradiation of an active energy ray such as UV ray in particular at a low energy level such as 150 mJ/cm$^2$ or less of a cumulative amount of UV ray having a wavelength of 365 nm. That is, it has a marked curing property. Furthermore, the ink composition of the present invention has good print quality on the nonabsorbable printing medium. In particular, since it contains no diluent solvent, the ink composition has good adhesion to the printing medium.

In the present invention, the ink composition is cured with an active energy ray such as UV ray after it is ejected by the ink jet printing system.

The active energy ray is preferably irradiated in a period of 1 to 1,000 milliseconds immediately after the ejection of the ink composition on the printing medium. If this period is less than 1 millisecond, a distance between a head and a light source is too short so that the head may be irradiated with the active energy ray to cause unexpected problems. When this period is longer than 1,000 milliseconds, the inks run to cause the deterioration of the print quality in multi-color printing.

As a light source for irradiating UV ray, a high pressure mercury lamp, a low pressure mercury lamp, a cold cathode tube, a black light, a UV LED, a UV laser, a flash light, etc. may be used. Two light sources having different illuminances may be used to carry out the curing of the ink composition. In such a case, the cumulative amount of UV ray is 150 mJ/cm$^2$ or less, as described above.

It is possible to use four or more active energy ray-curable ink compositions according to the present invention including at least cyan, magenta, yellow and black ink compositions at the same time to print an image by the above printing method.

Now, the present invention will be illustrated by the examples of the present invention. The compositions of the UV-curable ink compositions described below are examples, and do not limit the scope of the present invention in any way. Hereinafter, "parts" mean "parts by weight".

Example 1

In a 100 cc plastic bottle, 20.0 parts of HOSTAPERM BLUE P-BFS (available from Clariant, Inc., a copper phthalocyanine blue pigment), 33.3 parts of DISPER BYK 168 as a pigment-dispersant (available from BYK-Chemie, an amine type polymer dispersant), 46.7 parts of dimethylacrylamide (DMAA) as an acrylamide derivative (available from KOHJIN Co., Ltd.) and 100 parts of zirconia beads having a diameter of 0.3 mm were weighed and charged, and dispersed with a paint conditioner (available from Toyo Seiki Seisaku-Sho Ltd.) for 2 hours.

To 25.0 parts of the resulting dispersion, 45.5 parts of DMAA as an acrylamide derivative, 19.5 parts of LIGHT-ACRYLATE as a polyfunctional monomer (available from KYOEISHA CHEMICAL Co., Ltd., dipentaeritbritol hexaacrylate, hexafunctional monomer), 9.0 parts of IRGACURE 907 as a photopolymerization initiator (available from Ciba Specialty Chemicals Co., Ltd., 2-methyl-1-[4-(methylthio)phenyl]-2-morpholinopropan-1-one) and 1.0 part of DET-X as a photopolymerization initiator (available ftom NIPPON KAYAKU Co., Ltd., 2,4-diethylthioxanthone) were added and stirred with a magnetic stirrer for 30 minutes, followed by suction filtration through a glass filter (available from KIRIYAMA GLASS WORKS Co.) to obtain UV-curable ink composition A.

Example 2

In a 100 cc plastic bottle, 20.0 parts of HOSTAPERM PINK EB trans (available from Clariant, Inc., a quinacridone pigment), 46.7 parts of DISPER BYK 168 as a pigment-dispersant, 33.3 parts of DMAA as an acrylamide derivative and 100 parts of zirconia beads having a diameter of 0.3 mm were weight and charged and dispersed with a paint conditioner (available from Toyo Seiki Seisaku-Sho Ltd.) for 2 hours.

Using the dispersion obtained in the above, UV-curable ink composition B was prepared in the same manner as in Example 1.

Example 3

In a 100 cc plastic bottle, 20.0 parts of E4GN-GT (available from Bayer, a nickel-containing azo pigment), 26.6 parts of DISPER BYK 168 as a pigment-dispersant, 53.4 parts of DMAA as an acrylamide derivative and 100 parts of zirconia beads having a diameter of 0.3 mm were weighed and charged, and dispersed with a paint conditioner (available from Toyo Seiki Seisaku-Sho Ltd.) for 2 hours.

Using the dispersion obtained in the above, UV-curable ink composition C was prepared in the same manner as in Example 1.

Example 4

In a 100 cc plastic bottle, 20.0 parts of MA-8 (available from MITSUBISHI CHEMICAL CORPORATION, an acidic carbon black pigment), 26.6 parts of DISPER BYK 168 as a pigment-dispersant, 53.4 parts of DMAA as an acrylamide derivative and 100 parts of zirconia beads having a diameter of 0.3 mm were weighed and charged, and dispersed with a paint conditioner (available from Toyo Seiki Seisaku-Sho Ltd.) for 2 hours.

Using the dispersion obtained in the above, UV-curable ink composition D was prepared in the same manner as in Example 1.

Example 5

In a 100 cc plastic bottle, 20.0 parts of HOSTAPERM BLUE P-BFS (available from Clariant, Inc., a copper phthalocyanine blue pigment), 33.3 parts DISPER BYK 168 as a pigment-dispersant, 46.7 parts of acryloylmorpholine (ACMO) as an acrylamide derivative (available from KOHJIN Co., Ltd.) and 100 parts of zirconia beads having a diameter of 0.3 mm were weighed and charged, and dispersed with a paint conditioner (available from Toyo Seiki Seisaku-Sho Ltd.) for 2 hours.

To 25.0 parts of the dispersion obtained in the above, 45.5 parts of ACMO as an acrylamide derivative, 19.5 parts OF LIGHT-ACRYLATE DPE-6A as a polyfunctional monomer, 9.0 parts of IRGACURE 907 as a photopolymerization initiator and 1.0 parts of DET-X as a photopolymerization initiator were added, and stirred with a magnetic stirrer for 30 minutes, followed by suction filtration through a glass filter (available from KIRIYAMA GLASS WORKS Co.) to obtain UV-curable ink composition E.

Example 6

In a 100 cc plastic bottle, 20.0 parts of HOSTAPERM BLUE P-BFS (available from Clariant, Inc., a copper phthalocyanine blue pigment), 33.3 parts of DISPER BYK 168 as a pigment-dispersant, 46.7 parts of DMAA as an acrylamide derivative and 100 parts of zirconia beads having a diameter of 0.3 mm were weighed and charged, and dispersed with a paint conditioner (available from Toyo Seiki Seisaku-Sho Ltd.) for 2 hours.

To 25.0 parts of the dispersion obtained in the above, 45.5 parts of DMAA as an acrylamide derivative, 19.5 parts of LIGHT-ACRYLATE PE-4A as a polyfunctional monomer (available from KYOEISHA CHEMICAL Co., Ltd., pentaerythritol tetraacrylate, a tetrafunctional monomer), 9.0 parts of IRGACURE 907 as a photopolymerization initiator and 1.0 part of DET-X as a photopolymerization initiator were added, and stirred with a magnetic stirrer for 30 minutes, followed by suction filtration through a glass filter (available from KIRIYAMA GLASS WORKS Co.) to obtain UV-curable ink composition F.

Example 7

In a 100 cc plastic bottle, 20.0 parts of HOSTAPERM BLUE P-BFS (available from Clariant, Inc., a copper phthalocyanine blue pigment), 33.3 parts of DISPER BYK 168 as a pigment-dispersant, 46.7 parts of diethylacrylamide (DEAA) as an acrylamide derivative (available from KOHJIN Co., Ltd.) and 100 parts of zirconia beads having a diameter of 0.3 mm were weighed and charged, and dispersed with a paint conditioner (available from Toyo Seiki Seisaku-Sho Ltd.) for 2 hours.

To 25.0 parts of the dispersion obtained in the above, 45.5 parts of DEAA as an acrylamide derivative, 19.5 parts of LIGHT-ACRYLATE DPE-6A as a polyfunctional monomer, 9.0 parts of IRGACURE 907 as a photopolymerization initiator and 1.0 part of DET-X as a photopolymerization initiator were added, and stirred with a magnetic stirrer for 30 minutes, followed by suction filtration through a glass filter (available from KIRIYAMA GLASS WORKS Co.) to obtain UV-curable ink composition G.

Example 8

In a 100 cc plastic bottle, 20.0 parts of HOSTAPERM BLUE P-BFS (available from Clariant, Inc., a copper phthalocyanine blue pigment), 33.3 parts of DISPER BYK 168 as a pigment-dispersant, 46.7 parts of dimethylacrylamide (DMAA) as an acrylamide derivative and 100 parts of zirconia beads having a diameter of 0.3 mm were weighed and charged, and dispersed with a paint conditioner (available from Toyo Seiki Seisaku-Sho Ltd.) for 2 hours.

To 25.0 parts of the dispersion obtained in the above, 45.5 parts of DMAA as an acrylamide derivative, 19.5 parts of LIGHT-ACRYLATE DPE-6A as a polyfunctional monomer and 10.0 parts of IRGACURE 907 as a photopolymerization initiator were added, and stirred with a magnetic stirrer for 30 minutes, followed by suction filtration through a glass filter (available from KIRIYAMA GLASS WORKS Co.) to obtain UV-curable ink composition H.

Example 9

In a 100 cc plastic bottle, 20.0 parts of HOSTAPERM BLUE P-BFS (available from Clariant, Inc., a copper phthalocyanine blue pigment), 33.3 parts of DISPER BYK 168 as a pigment-dispersant, 46.7 parts of dimethylacrylamide (DMAA) as an acrylamide derivative and 100 parts of zirconia beads having a diameter of 0.3 mm were weighed and charged, and dispersed with a paint conditioner (available from Toyo Seiki Seisaku-Sho Ltd.) for 2 hours.

To 25.0 parts of the dispersion obtained in the above, 45.5 parts of DMAA as an acrylamide derivative, 19.5 parts of LIGHT-ACRYLATE DPE-6A as a polyfunctional monomer, 9.0 parts of IRGACURE 819 as a photopolymerization initiator (available from Ciba Specialty Chemicals, Inc., bis(2,4,6-trimethylbenzoyl)-phenylphosphine oxide), 1.0 part of KAYACURE BMS as a polymerization initiator (available from NIPPON KAYAKU Co., Ltd., [4-(methylphenylthio)phenyl]phenylmethane) were added, and stirred with a magnetic stirrer for 30 minutes, followed by suction filtration through a glass filter (available from KIRIYAMA GLASS WORKS Co.) to obtain UV-curable ink composition I.

Example 10

In a 100 cc plastic bottle, 20.0 parts of HOSTAPERM BLUE P-BFS (available from Clariant, Inc., a copper phthalocyanine blue pigment), 33.3 parts of DISPER BYK 168 as a pigment-dispersant, 46.7 parts of dimethylacrylamide (DMAA) as an acrylamide derivative and 100 parts of zirconia beads having a diameter of 0.3 mm were weighed and charged, and dispersed with a paint conditioner (available from Toyo Seiki Seisaku-Sho Ltd.) for 2 hours.

To 25.0 parts of the dispersion obtained in the above, 45.5 parts of DMAA as an acrylamide derivative, 19.5 parts of LIGHT-ACRYLATE DPE-6A as a polyfunctional monomer, 5.0 parts of IRGACURE 907 as a photopolymerization initiator, 3.0 parts of IRGACURE 184 as a photopolymerization initiator (available from Ciba Specialty Chemicals, Inc., 1-hydroxycyclohexyl phenyl ketone) and 2.0 parts of KAYACURE BMS as a photopolymerization initiator were added, and stirred with a magnetic stirrer for 30 minutes, followed by suction filtration through a glass filter (available from KIRIYAMA GLASS WORKS Co.) to obtain UV-curable ink composition J.

Example 11

In a 100 cc plastic bottle, 20.0 parts of HOSTAPERM BLUE P-BFS (available from Clariant, Inc., a copper phthalocyanine blue pigment), 33.3 parts of DISPER BYK 168 as a pigment-dispersant, 46.7 parts of dimethylacrylamide (DMAA) as an acrylamide derivative and 100 parts of zirconia beads having a diameter of 0.3 mm were weighed and charged, and dispersed with a paint conditioner (available from Toyo Seiki Seisaku-Sho Ltd.) for 2 hours.

To 25.0 parts of the dispersion obtained in the above, 45.5 parts of DMAA as an acrylamide derivative, 19.5 parts of LIGHT-ACRYLATE DPE-6A as a polyfunctional monomer and 10.0 parts of IRGACURE 819 as a photopolymerization initiator were added, and stirred with a magnetic stirrer for 30 minutes, followed by suction filtration through a glass filter (available from KIRIYAMA GLASS WORKS Co.) to obtain UV-curable ink composition K.

Example 12

In a 100 cc plastic bottle, 20.0 parts of HOSTAPERM BLUE P-BFS (available from Clariant, Inc., a copper phthalocyanine blue pigment), 33.3 parts of DISPER BYK 168 as a pigment-dispersant, 46.7 parts of dimethylacrylamide (DMAA) as an acrylamide derivative and 100 parts of zirconia beads having a diameter of 0.3 mm were weighed and charged, and dispersed with a paint conditioner (available from Toyo Seiki Seisaku-Sho Ltd.) for 2 hours.

To 25.0 parts of the dispersion obtained in the above, 45.5 parts of DMAA as an acrylamide derivative, 19.5 parts of LIGHT-ACRYLATE DPE-6A as a polyfunctional monomer and 10.0 parts of IRGACURE 184 as a photopolymerization initiator were added, and stirred with a magnetic stirrer for 30 minutes, followed by suction filtration through a glass filter (available from KIRIYAMA GLASS WORKS Co.) to obtain UV-curable ink composition L.

Example 13

UV curable ink jet ink composition M was prepared in the same manner as in Example 1 except that the same amount of CTX (available from NIPPON KAYAKU Co., Ltd., 2-chlorothioxanthone) was used in place of DET-X (available from NIPPON KAYAKU Co., Ltd., 2,4-diethylthioxanthone) as one photopolymerization initiator.

Comparative Example 1

In a 100 cc plastic bottle, 20.0 parts of HOSTAPERM BLUE P-BFS (available from Clariant, Inc., a copper phthalocyanine blue pigment), 33.3 parts of DISPER BYK 168 as a pigment-dispersant, 46.7 parts of isononyl acrylate (AIN) as a monofunctional monomer (NIPPON SHOKUBAI Co., Ltd.) and 100 parts of zirconia beads having a diameter of 0.3 mm were weighed and charged, and dispersed with a paint conditioner (available from Toyo Seiki Seisaku-Sho Ltd.) for 2 hours.

To 25.0 parts of the dispersion obtained in the above, 45.5 parts of AIN as a monofunctional monomer, 19.5 parts of LIGHT-ACRYLATE DPE-6A as a polyfunctional monomer, 9.0 parts of IRGACURE 907 as a photopolymerization initiator and 1.0 part of DET-X as a photopolymerization initiator were added, and stirred with a magnetic stirrer for 30 minutes, followed by suction filtration through a glass filter (available from KIRIYAMA GLASS WORKS Co.) to obtain UV-curable ink composition N.

Comparative Example 2

In a 100 cc plastic bottle, 20.0 parts of HOSTAPERM BLUE P-BFS (available from Clariant, Inc., a copper phthalocyanine blue pigment), 33.3 parts of DISPER BYK 168 as a pigment-dispersant, 46.7 parts of DMAA as an acrylamide derivative and 100 parts of zirconia beads having a diameter of 0.3 mm were weighed and charged, and dispersed with a paint conditioner (available from Toyo Seiki Seisaku-Sho Ltd.) for 2 hours.

To 25.0 parts of the dispersion obtained in the above, 10.0 parts of DMAA as an acrylamide derivative, 55.0 parts of LIGHT-ACRYLATE DPE-6A as a polyfunctional monomer, 9.0 parts of IRGACURE 907 as a photopolymerization initiator and 1.0 part of DET-X as a photopolymerization initiator were added, and stirred with a magnetic stirrer for 30 minutes, followed by suction filtration through a glass filter (available from KIRIYAMA GLASS WORKS Co.) to obtain UV-curable ink composition O.

The ingredient compositions of UV-curable ink composition A to M prepared in Examples 1 to 13 and UV-curable ink composition N and O prepared in Comparative Examples 1 and 2 are summarized in Tables 1 to 4. The abbreviations used in Table 1 to 4 have the following meanings:

BYK-168: DISPER BYK 168
DMAA: dimethylacrylamide
AGMO: acryloylmorpholine
DEAA: diethylacrylanilde
AIN: isononyl acrylate
DPE-6A: LIGHT ACRYLATE DPE-6A
  (dipentaerithritol hexaacrylate)
PE-4A: LIGHT ACRYLATE PE-4A
  (pentaerythritol tetraacrylate)
IRG.907: IRGACURE 907
  (2-methyl-1-[4-(methylthio)phenyl]-2-morpholino-propan-1-one)
DET-X: DET-X 2,4-diethylthioxanthone)
IRG.184: IRGACURE 184 (1-hydroxycyclohexyl phenyl ketone)
IRG.819: IRGACURE 819
  (bis(2,4,6-trimethylbenzoyl)-phenylphosphine oxide)
BMS: KAYACURE BMX
  (4-(methylphenylthio)phenyl]phenylmethanone)
CTX: CTX (2-chlorothioxanthone)

TABLE 1

| | Example No. | | | |
|---|---|---|---|---|
| | 1 | 2 | 3 | 4 |
| Pigment (parts) | 5.0 | 5.0 | 5.0 | 5.0 |
| Polymer as a pigment-dispersant [BYK-168] (parts) | 8.3 | 11.7 | 6.7 | 6.7 |
| Acrylamide derivative | | | | |
| DMAA (parts) | 57.2 | 53.8 | 58.8 | 58.8 |
| ACMO (parts) | — | — | — | — |
| DEAA (parts) | — | — | — | — |
| Monofunctional monomer | | | | |
| AIN (parts) | — | — | — | — |
| Polyfunctional monomer | | | | |
| DPE-6A (parts) | 19.5 | 19.5 | 19.5 | 19.5 |
| PE-4A (parts) | — | — | — | — |
| Photopolymerization initiator | | | | |
| IRG. 907 (parts) | 9.0 | 9.0 | 9.0 | 9.0 |
| DET-X (parts) | 1.0 | 1.0 | 1.0 | 1.0 |

TABLE 2

| | Example No. | | | |
|---|---|---|---|---|
| | 5 | 6 | 7 | 8 |
| Pigment (parts) | 5.0 | 5.0 | 5.0 | 5.0 |
| Polymer as a pigment-dispersant [BYK-168] (parts) | 8.3 | 8.3 | 8.3 | 8.3 |
| Acrylamide derivative | | | | |
| DMAA (parts) | — | 57.2 | — | 57.2 |
| ACMO (parts) | 57.2 | — | — | — |
| DEAA (parts) | — | — | 57.2 | — |
| Monofunctional monomer | | | | |
| AIN (parts) | — | — | — | — |
| Polyfunctional monomer | | | | |
| DPE-6A (parts) | 19.5 | — | 19.5 | 19.5 |
| PE-4A (parts) | — | 19.5 | — | — |
| Photopolymerization initiator | | | | |
| IRG. 907 (parts) | 9.0 | 9.0 | 9.0 | 10.0 |
| DET-X (parts) | 1.0 | 1.0 | 1.0 | — |

TABLE 3

| | Example No. | | | |
|---|---|---|---|---|
| | 9 | 10 | 11 | 12 |
| Pigment (parts) | 5.0 | 5.0 | 5.0 | 5.0 |
| Polymer as a pigment-dispersant [BYK-168] (parts) | 8.3 | 8.3 | 8.3 | 8.3 |
| Acrylamide derivative | | | | |
| DMAA (parts) | 57.2 | 57.2 | 57.2 | 57.2 |
| Monofunctional monomer | | | | |
| AIN (parts) | — | — | — | — |
| Polyfunctional monomer | | | | |
| DPE-6A (parts) | 19.5 | 19.5 | 19.5 | 19.5 |

TABLE 3-continued

|  | Example No. | | | |
| --- | --- | --- | --- | --- |
|  | 9 | 10 | 11 | 12 |
| Photopolymerization initiator | | | | |
| IRG. 907 (parts) | — | 5.0 | — | — |
| DET-X (parts) | — | — | — | — |
| IRG. 184 (parts) | — | 3.0 | — | 10.0 |
| IRG. 819 (parts) | 9.0 | — | 10.0 | — |
| BMS (parts) | 1.0 | 2.0 | — | — |

TABLE 4

|  | Example No. | | |
| --- | --- | --- | --- |
|  | 13 | Comp. 1 | Comp. 2 |
| Pigment (parts) | 5.0 | 5.0 | 5.0 |
| Polymer as a pigment-dispersant [BYK-168] (parts) | 8.3 | 8.3 | 8.3 |
| acrylamide derivative | | | |
| DMAA (parts) | 57.2 | — | 21.7 |
| ACMO (parts) | — | — | — |
| Monofunctional monomer | | | |
| AIN (parts) | — | 57.2 | — |
| Polyfunctional monomer | | | |
| DPE-6A (parts) | 19.5 | 19.5 | 55.0 |
| PE-4A (parts) | — | — | — |
| Photopolymerization initiator | | | |
| IRG. 907 (parts) | 9.0 | 9.0 | 9.0 |
| DET-X (parts) | — | 1.0 | 1.0 |
| CTX (parts) | 1.0 | — | — |

With UV-curable ink composition A to M prepared in Examples 1 to 13 and UV-curable ink composition N and O prepared in Comparative Examples 1 and 2, a viscosity (mPa·s) at 25° C., an average dispersion particle size, a surface tension, and storage stability on storing at 70° C. for 7 days were measured by the following methods. The results are reported in Table 5.

Viscosity: A viscosity of an ink composition was measured with a R100 type viscometer (manufactured by TOKI SANGYOU Co., Ltd.) at 25° C. and a cone revolution of 20 rpm.

Average dispersion particle size: An average dispersion particle size of pigment particles was measured with a particle size distribution meter N4-PLUS (a laser-Doppler type particle size distribution meter of Beckman Coulter, Inc.).

Surface tension: The surface tension of an ink composition was measured using a full-automatic balance type electro surface tensiometer ESB-V (manufactured by Kyowa Interface Science Co., Ltd.) at an ink composition temperature of 25° C.

Storage stability: An ink composition was stored at 70° C. for 7 days. During storage, the change of a viscosity of the ink composition was monitored and evaluated according to the following criteria:

A: The change of the viscosity is less than 10%.

B: The change of the viscosity is 10% or more.

TABLE 5

| Example No. | Viscosity at 25° C. (mPa·s) | Average dispersion particle size (nm) | Surface tension (mN/m) | Storage stability |
| --- | --- | --- | --- | --- |
| 1 | 6.7 | 110.0 | 36.8 | A |
| 2 | 7.7 | 150.0 | 36.7 | A |
| 3 | 5.2 | 150.0 | 36.7 | A |
| 4 | 4.3 | 105.0 | 36.4 | A |
| 5 | 9.5 | 110.0 | 38.5 | A |
| 6 | 5.0 | 110.0 | 36.2 | A |
| 7 | 5.0 | 110.0 | 36.5 | A |
| 8 | 7.0 | 110.0 | 36.7 | A |
| 9 | 6.8 | 110.0 | 36.7 | A |
| 10 | 7.1 | 110.0 | 36.8 | A |
| 11 | 7.5 | 110.0 | 36.5 | A |
| 12 | 7.5 | 110.0 | 36.6 | A |
| 13 | 6.6 | 110.0 | 36.7 | A |
| Comp. 1 | 10.0 | 110.0 | 29.0 | A |
| Comp. 2 | 55.0 | 110.0 | 36.2 | A |

Next, with UV-curable ink composition A to M prepared in Examples 1 to 13 and UV-curable ink composition N and O prepared in Comparative Examples 1 and 2, a continuous ejection property, a curing property and a substrate-adhesion were measured by the following methods. The results are reported in Table 6.

Continuous ejection property: Using an ink jet printer equipped with piezo-type ink jet nozzles, an ink composition was printed on a printing medium, and the continuous ejection property was evaluated according to the following criteria:

A. No injection error occurs after continuous ejection for 30 minutes

B: No ejection error occurs after continuous ejection for 30 minutes, but satellites generate.

C: Ejection error occurs during continuous ejection for 30 minutes.

The ink supply unit of the printer consisted of an ink tank, a supply pipe, an anterior room of an ink tank right before a head and a piezo head. The size of a droplet of an ink composition was about 7 picoliters, and the unit was driven at a drive frequency of 10 KHz so that the ink composition can be ejected at a resolution of 600×600 dpi (dpi: dots per inch (2.54 cm)).

Curing property: An ink composition was coated on a printing medium made of a film of polyvinyl chloride (PVC) or polyethylene terephthalate (PET) with a bar coater (#12) to form a printed film having a thickness of 10 μm, and the printed film was irradiated with a metal halide lamp (120 W) to a total dose of 150 mJ/cm$^2$ to cure the ink composition.

The cured printed material was touched with a finger and the adhesion of the ink composition to the finger was checked with an eye and evaluated according to the following criteria:

A: No adhesion to a finger.

B: No adhesion to the finger but a mark remaining on the surface of a printed material.

B: Adhesion to a finger.

Substrate-adhesion: An ink composition was coated on a printing medium made of a film of polyvinyl chloride (PVC) or polyethylene terephthalate (PET) with a bar coater (#12) to form a printed film having a thickness of 10 μm, and the printed film was irradiated with a metal halide lamp (120 W) to a total dose of 150 mJ/cm$^2$ to cure the ink composition.

The cured printed material was subjected to a cross-cut adhesion test with 100 pieces each 1 mm square according to JIS K5400, and the peeling state was checked using an adhesive tape. The number of the 1 mm square pieces which were not peeled and remained on the substrate was counted among 100 pieces, and evaluated according to the following criteria:

A: The number of peeled pieces was 10 or less.

B: The number of peeled pieces was 20 or less.

C: The number of peeled pieces was 21 or more.

TABLE 6

| Example No. | Continuous ejection property | Curing property | Substrate-adhesion | |
|---|---|---|---|---|
| | | | PVC | PET |
| 1 | A | A | A | A |
| 2 | A | A | A | A |
| 3 | A | A | A | A |
| 4 | A | A | A | A |
| 5 | A | A | A | A |
| 6 | A | A | A | A |
| 7 | A | A | A | A |
| 8 | A | B | B | B |
| 9 | A | B | A | A |
| 10 | A | B | A | A |
| 11 | A | B | B | B |
| 12 | A | B | B | B |
| 13 | A | A | A | A |
| Comp. 1 | A | C | — | — |
| Comp. 2 | C | A | — | — |

As can be seen from the results above, UV-curable ink composition A to M of Examples 1 to 13 according to the present invention had the suitable properties as ink compositions and good storage stability. In addition, UV-curable ink composition A to M had the good continuous property, curing property and substrate-adhesion. With regard to the curing property, the ink compositions A to M were quickly cured with a low energy level such as a cumulative amount of light of 150 mJ/cm$^2$. Therefore, the ink compositions of the present invention can stably be printed with the ink jet printing system at room temperature.

In contrast, with UV-curable ink compositions N and O of Comparative Examples 1 and 2, which are both outside the present invention, one of the continuous ejection property, curing property and substrate-adhesion was low, so that they could not stably be printed with the ink jet printing system at room temperature.

The separate experiments from the above showed that, when the amount of the tri- or higher polyfunctional monomer was decreased, or when a difunctional monomer (for example, LIGHT-ACRYLATE NP-A (available from KYOEISHA CHEMICAL Co., Ltd., neopentyl glycol diacrylate) was used in place of the tri- or higher polyfunctional monomer, the curing property and/or the continuous ejection property tended to deteriorate. Those results confirm that it is desirable to use the tri- or higher polyfunctional monomer in an adequate amount.

The invention claimed is:

1. An active energy ray-curable ink composition comprising a colorant, a monomer and a photopolymerization initiator, wherein the monomer comprises an acrylamide derivative, which is a liquid at room temperature, and a tri- or higher polyfunctional acrylate monomer, an amount of the acrylamide derivative is 10 to 90% by weight and an amount of the tri- or higher polyfunctional acrylate monomer is 10 to 50% by weight, each based on the whole weight of the ink composition, and the ink composition has a viscosity of 3 to 35 mPa·s at 25° C.

2. The active energy ray-curable ink composition according to claim 1, wherein the viscosity of the ink composition is 3 to 20 mPa·s at 25° C.

3. The active energy ray-curable ink composition according to claim 1 or 2, which comprises at least two photopolymerization initiators.

4. The active energy ray-curable ink composition according to claim 3, which comprises at least 2-methyl-1[4-(methylthio)phenyl]-2-morpholinopropan-1-one and a compound selected from thioxanthones.

5. The active energy ray-curable ink composition according to claim 1, wherein an amount of the photopolymerization initiator is 1 to 20% by weight based on the whole weight of the ink composition.

6. The active energy ray-curable ink composition according to claim 1, wherein the colorant is an organic pigment and/or an inorganic pigment.

7. The active energy ray-curable ink composition according to claim 5, wherein an amount of the organic pigment and/or inorganic pigment is 1 to 10% by weight based on the whole weight of the ink composition.

8. The active energy ray-curable ink composition according to claim 6, which comprises a polymer as a pigment dispersant.

9. The active energy ray-curable ink composition according to claim 8, wherein an amount of the polymer is 5 to 150% by weight based on the weight of the organic pigment and/or inorganic pigment.

10. The active energy ray-curable ink composition according to claim 1, which is cured at a cumulative amount of light of 150 mJ/cm$^2$ or less.

11. The active energy ray-curable ink composition according to claim 1, which is used in an ink jet printing system.

12. The active energy ray-curable ink composition according to claim 1, wherein said acrylamide derivative is at least one acrylamide derivative selected from the group consisting of N,N-dimethyl(meth)acrylamide, N,N-diethyl(meth)acrylamide, (meth)acryloylmorpholine, N,N-dimethylaminoethyl(meth)acrylamide, and N,N-dimethylaminopropyl(meth)acrylamide.

* * * * *